(12) United States Patent
Lee et al.

(10) Patent No.: US 10,602,365 B2
(45) Date of Patent: Mar. 24, 2020

(54) PRIVATE NETWORK SERVICE PROVIDING METHOD AND SYSTEM

(71) Applicant: KT Corporation, Seongnam-si (KR)

(72) Inventors: Hyun-Song Lee, Seoul (KR); Sang-Woo Woo, Uiwang-si (KR); Yong-Joo Cha, Seongnam-si (KR)

(73) Assignee: KT Corporation, Seongnam-si (KR)

( * ) Notice: Subject to any disclaimer, the term of this patent is extended or adjusted under 35 U.S.C. 154(b) by 167 days.

(21) Appl. No.: 15/570,650

(22) PCT Filed: Apr. 11, 2016

(86) PCT No.: PCT/KR2016/003776
§ 371 (c)(1),
(2) Date: Oct. 30, 2017

(87) PCT Pub. No.: WO2016/175479
PCT Pub. Date: Nov. 3, 2016

(65) Prior Publication Data
US 2018/0295509 A1    Oct. 11, 2018

(30) Foreign Application Priority Data

Apr. 30, 2015  (KR) .......................... 10-2015-0061729
Jun. 8, 2015   (KR) .......................... 10-2015-0080733
Sep. 14, 2015  (KR) .......................... 10-2015-0129806

(51) Int. Cl.
*H04W 12/08* (2009.01)
*H04W 80/10* (2009.01)
(Continued)

(52) U.S. Cl.
CPC ..... *H04W 12/0806* (2019.01); *H04L 63/0209* (2013.01); *H04L 63/102* (2013.01);
(Continued)

(58) Field of Classification Search
CPC ................................................. H04W 12/0806
See application file for complete search history.

(56) References Cited

U.S. PATENT DOCUMENTS 8,270,963 B1 *  9/2012  Hart .......................... G06F 8/65
                                                        455/418
8,412,175 B2 *  4/2013  Hart .......................... G06F 8/65
                                                        455/418
(Continued)

FOREIGN PATENT DOCUMENTS

KR   10-2009-0047866 A    5/2009
KR   10-2011-0042896 A    4/2011
KR       10-1216542 B1    1/2013
KR   10-2013-0141990 A   12/2013
(Continued)

OTHER PUBLICATIONS

International Search Report for PCT/KR2016/003776 dated Aug. 1, 2016 [PCT/ISA/210].

*Primary Examiner* — Bradley W Holder
(74) *Attorney, Agent, or Firm* — Sughrue Mion, PLLC

(57) ABSTRACT

A private network service providing method and system for breaking dependency on a terminal and providing a private network service is provided. The private network service system according to the present exemplary embodiments include: a service linkage server for, when access to a private network is requested by a mobile communication terminal connected to a public network or access of the mobile communication terminal to the private network is requested by a third server, identifying identification information of the mobile communication terminal and requesting an access point name-operator identifier (APN-OI) change to a home subscriber server; the home subscriber server for authenticating whether the mobile communication terminal is subscribed to a private network service when the APN-OI change is requested by the service linkage server, and identifying an access point name (APN) included in a (Continued)

subscriber profile of the mobile communication terminal and changing a public APN-OI recorded in the APN to a private APN-OI when the authenticating is successful; and a mobility management entity for receiving the subscriber profile of the mobile communication terminal from the home subscriber server when there is an attempt of access from the mobile communication terminal, and inducing the mobile communication terminal to connect to a public gateway or a private gateway, using an IP address of the public gateway or IP address of the private gateway corresponding to the APN included in the subscriber profile.

19 Claims, 6 Drawing Sheets

(51) Int. Cl.
| | |
|---|---|
| H04W 8/02 | (2009.01) |
| H04W 8/20 | (2009.01) |
| H04W 84/10 | (2009.01) |
| H04L 29/06 | (2006.01) |
| H04W 4/00 | (2018.01) |
| H04W 8/18 | (2009.01) |
| H04W 8/04 | (2009.01) |
| H04W 12/06 | (2009.01) |
| H04W 8/06 | (2009.01) |

(52) U.S. Cl.
CPC ............... *H04W 4/00* (2013.01); *H04W 8/02* (2013.01); *H04W 8/04* (2013.01); *H04W 8/186* (2013.01); *H04W 8/20* (2013.01); *H04W 12/06* (2013.01); *H04W 12/08* (2013.01); *H04W 80/10* (2013.01); *H04W 84/10* (2013.01); *H04W 8/06* (2013.01)

(56) References Cited

U.S. PATENT DOCUMENTS

| | | | | |
|---|---|---|---|---|
| 8,458,800 | B1* | 6/2013 | Van Voorhees | H04L 63/105 |
| | | | | 726/26 |
| 8,495,731 | B1* | 7/2013 | Mar | G06F 21/74 |
| | | | | 726/21 |
| 8,594,652 | B2* | 11/2013 | Hart | G06F 8/65 |
| | | | | 455/418 |
| 9,015,809 | B2* | 4/2015 | Brown | H04W 12/02 |
| | | | | 726/4 |
| 9,191,388 | B1* | 11/2015 | Paczkowski | H04L 67/327 |
| 2003/0163577 | A1* | 8/2003 | Moon | H04L 29/06 |
| | | | | 709/229 |
| 2004/0022258 | A1* | 2/2004 | Tsukada | H04L 63/0272 |
| | | | | 370/401 |
| 2006/0233166 | A1* | 10/2006 | Bou-Diab | H04L 63/08 |
| | | | | 370/389 |
| 2006/0233180 | A1* | 10/2006 | Serghi | H04L 29/06 |
| | | | | 370/401 |
| 2008/0102816 | A1* | 5/2008 | Shan | H04W 8/02 |
| | | | | 455/424 |
| 2009/0122772 | A1* | 5/2009 | Jung | H04L 63/102 |
| | | | | 370/338 |
| 2010/0178915 | A1* | 7/2010 | Choi | H04W 36/385 |
| | | | | 455/426.1 |
| 2010/0302998 | A1* | 12/2010 | Bao | H04W 74/008 |
| | | | | 370/315 |
| 2012/0317617 | A1* | 12/2012 | Hart | G06F 8/65 |
| | | | | 726/3 |
| 2013/0157645 | A1* | 6/2013 | Hart | G06F 8/65 |
| | | | | 455/418 |
| 2013/0303146 | A1* | 11/2013 | Van Voorhees | G06F 21/53 |
| | | | | 455/418 |
| 2014/0280810 | A1* | 9/2014 | Gabrielson | H04L 41/0806 |
| | | | | 709/222 |

FOREIGN PATENT DOCUMENTS

| | | |
|---|---|---|
| KR | 10-2014-0055562 A | 5/2014 |
| KR | 10-2015-0035143 A | 4/2015 |

* cited by examiner

PRIVATE NETWORK SERVICE PROVIDING METHOD AND SYSTEM

CROSS-REFERENCE TO RELATED APPLICATIONS

This application is a National Stage of International Application No. PCT/KR2016/003776 filed Apr. 11, 2016 claiming priority to Korean Patent Application No. 10-2015-0061729 filed in the Republic of Korea on Apr. 30, 2015, Korean Patent Application No. 10-2015-0080733 filed in the Republic of Korea on Jun. 8, 2015, and Korean Patent Application No. 10-2015-0129806 filed in the Republic of Korea on Sep. 14, 2015, the disclosures of which are incorporated herein by reference in their entireties.

BACKGROUND

1. Field

The present disclosure relates to private network service technology, and more particularly, to a private network service providing method and system for providing a private network service, breaking away from the dependency on the terminal.

2. Description of the Related Art

Today, with the development of mobile communication systems, there are provided communication services based on next-generation mobile communication technology, a Long Term Evolution (LTE) communication system. The LTE communication system includes an Evolved Packet Core (EPC) network including Mobility Management Entity (MME), Serving Gateway (SGW) and Packet data network Gateway (PGW or PDN-GW), and provides users with services using the EPC. Korean Patent No. 10-1216542 discloses PDN-GW of the EPC network.

As wideband mobile communication markets flourish and smartphones become widespread, there are increasing approaches to make use of wideband mobile communication and smartphones for business services.

Accordingly, technology to connect a mobile communication terminal to one of private and public networks has emerged. Conventional private network access technology connects a mobile communication terminal to a public or private network based on an Access Point Name (APN) to which the mobile communication terminal makes an initial connection. That is, the conventional private network access technology connects the mobile communication terminal to a public network when the mobile communication terminal attempts connection using a public APN, and connects the mobile communication terminal to a private network when the mobile communication terminal attempts connection using a private APN.

However, because the conventional private network access technology connects the mobile communication terminal based on one of a public APN and a private APN selected by the mobile communication terminal, it is dependent on the mobile communication terminal. That is, because the conventional private network access technology requires the mobile communication terminal to have an extra function to select an APN, it cannot be applied to terminals that do not support an APN selection function, and there is a problem in manufacturing with the incorporation of an APN selection function into new mobile communication terminals.

SUMMARY

A private network service system according to a first aspect of the present disclosure includes a service link server configured to identify identification information of a mobile communication terminal which is being connected to a public network and request APN-OI change to a home subscriber server, when the service link server receives a request for private network connection from the mobile communication terminal or a request for private network connection of the mobile communication terminal from a third server, a home subscriber server configured to authenticate whether the mobile communication terminal is a terminal having subscribed to a private network service in response to the request for APN-OI change from the service link server, and when the authentication succeeds, to identify Access Point Name (APN) included in a subscriber profile of the mobile communication terminal, and change a public Access Point Name-Operator Identifier (APN-OI) recorded in the APN to a private APN-OI, and a mobility management entity configured to receive the subscriber profile of the mobile communication terminal from the home subscriber server, and induce the mobile communication terminal to connect to a public gateway or a private gateway using an IP address of a public gateway or an IP address of a private gateway corresponding to the APN included in the subscriber profile, when connection is attempted from the mobile communication terminal.

A method for providing, by a private network service system, a subscriber with a private network service, in which a private network service system provides a subscriber with a private network service, according to a second aspect of the present disclosure, includes receiving a request for private network connection of a mobile communication terminal which is being connected to a public network, authenticating whether the mobile communication terminal is a terminal having subscribed to a private network service, when the authentication succeeds, identifying Access Point Name (APN) included in a subscriber profile of the mobile communication terminal, and changing a public Access Point Name-Operator Identifier (APN-OI) recorded in the APN to a private APN-OI, when a request for connection is received from the mobile communication terminal, identifying the subscriber profile of the mobile communication terminal, and obtaining an IP address of a private gateway corresponding to the APN included in the subscriber profile, and inducing the mobile communication terminal to connect to the private gateway using the obtained IP address of the private gateway.

A private network service system according to another aspect of the present disclosure includes a service link server configured to: obtain identification information of a mobile communication terminal connected to a public network, and request an Access Point Name-Operator Identifier (APN-OI) change from a home subscriber server, in response to the service link server receiving a request for a private network connection, the request for the private network connection being received from the mobile communication terminal or from a third server; a home subscriber server configured to: authenticate whether the mobile communication terminal is subscribed to a private network service in response to the request for the APN-OI change from the service link server, and in response to the authentication succeeding, identify an Access Point Name (APN) included in a subscriber profile of the mobile communication terminal stored on the home subscriber server and change a public APN-OI recorded in the APN to a private APN-OI; and a mobility management entity configured to: receive the subscriber profile of the mobile communication terminal from the home subscriber server, and induce the mobile communication terminal to connect to a public gateway or a private gateway using an IP address of a public gateway or an IP address of a private gateway corresponding to the APN included in the subscriber profile, in response to connection being attempted from the mobile communication terminal.

A method for providing, by a private network service system, a subscriber with a private network service, in which a private network service system provides a subscriber with the private network service, according to another aspect of the present disclosure, includes receiving a request for a private network connection of a mobile communication terminal connected to a public network; authenticating whether the mobile communication terminal is subscribed to the private network service; in response to the authentication succeeding, identifying an Access Point Name (APN) included in a subscriber profile of the mobile communication terminal, and changing a public Access Point Name-Operator Identifier (APN-OI) recorded in the APN to a private APN-OI; in response to a request for connection being received from the mobile communication terminal, identifying the subscriber profile of the mobile communication terminal, and obtaining an IP address of a public gateway or an IP address of a private gateway corresponding to the APN included in the subscriber profile; and inducing the mobile communication terminal to connect to the public gateway or the private gateway using the obtained IP address of the public gateway or the obtained IP address of the private gateway.

The present disclosure is proposed to solve the problem of the related art, and therefore the present disclosure is directed to providing a private network service providing method and system for providing a user with a private network service, breaking away from the dependency on the terminal and minimizing network changes.

These and other objects and advantages of the present disclosure may be understood from the following detailed description and will become more fully apparent from the embodiments of the present disclosure. Furthermore, it will be easily understood that some objects and advantages of the present disclosure may be realized by the features shown in the appended claims and combinations thereof.

The present disclosure provides a general purpose private network service irrespective of terminal standards by connecting a mobile communication terminal to a private network without changing the function of the terminal.

Additionally, the present disclosure has advantages because changes of a system can be minimized and costs incurred to maintain and manage a private network service can be minimized by providing a method and system for providing a private network service through changing the subscriber profile.

Moreover, the present disclosure has advantages because an initial construction cost of a private network system may be reduced and it is easy to expand and control a service, by providing a private network service using a home subscriber server of an established mobile communication network.

BRIEF DESCRIPTION OF DRAWINGS

The accompanying drawings illustrate exemplary embodiments of the present disclosure, and together with the detailed description for carrying out the invention, serve to provide further understanding of the technical spirit of the present disclosure. However, the present disclosure should not be construed as being limited to the drawings.

DETAILED DESCRIPTION OF EXEMPLARY EMBODIMENTS

The foregoing objects, features, and advantages will become apparent from the following detailed description with reference to the accompanying drawings, and accordingly, those skilled in the art will be able to easily practice the technical aspects of the present disclosure. Furthermore, in the description of the present disclosure, when it is deemed that certain detailed description of known technology related to the present disclosure may unnecessarily make the essence of the disclosure vague, its detailed description is omitted herein. Hereinafter, an exemplary embodiment of the present disclosure is described in detail with reference to the accompanying drawings.

Figure 1:
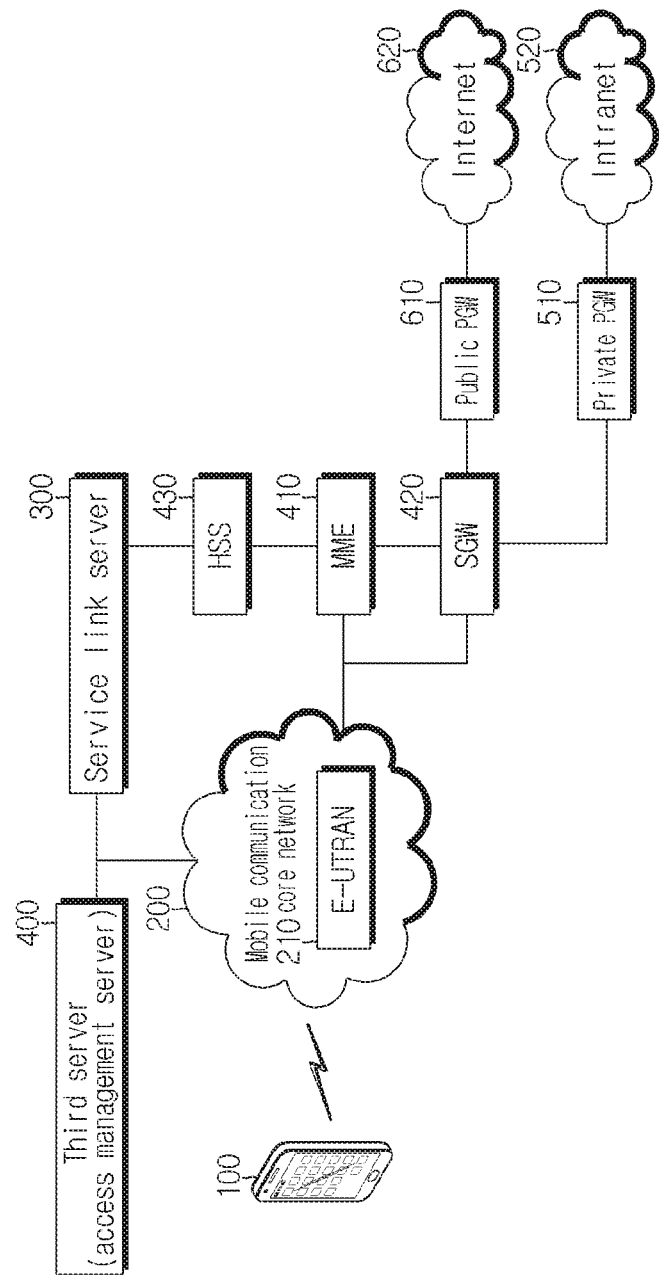
FIG. 1 is a diagram showing a private network service system according to an embodiment of the present disclosure.

FIG. 1 is a diagram showing a private network service system according to an embodiment of the present disclosure.

As shown in FIG. 1, the private network service system may include a mobile communication terminal 100, a service link server 300, a third server 400, a mobility management entity (hereinafter referred to as 'MME') 410, a home subscriber server (hereinafter referred to as 'HSS') 430, a serving gateway (hereinafter referred to as 'SGW') 420, a public PDN gateway (hereinafter referred to as 'public PGW') 610, and a private PDN gateway (hereinafter referred to as 'private PGW') 510.

The mobile communication terminal 100 is a communication device that provides or receives a voice call or data communication, and may also be called User Equipment (UE), Mobile Station (MS), User Terminal (UT), and Subscriber Station (SS). The mobile communication terminal 100 may transmit and receive data using a mobile communication core network 200.

The mobile communication core network 200 includes Evolved Universal Terrestrial Radio Access Network (E-UTRAN), Universal Terrestrial Radio Access Network (UTRAN), GSM EDGE Radio Access Network (GERAN) and WiFi network, and the mobile communication terminal 100 may use a mobile communication network to which an LTE network including an E-UTRAN 210 is linked. Also, in some cases, the mobile communication terminal 100 may use a mobile communication network to which a Wideband Code Division Multiple Access (WCDMA) network including UTRAN is linked, and alternatively, may use GERAN.

The mobile communication terminal 100 may have a private network service related application mounted thereon, and in this case, the mobile communication terminal 100 may request intranet connection to the service link server 300 by executing the private network service related application. In another embodiment, the mobile communication terminal 100 may request intranet connection to the service link server 300 by dialing a private network service identification code (for example, *770001). In still another embodiment, the third server 400 may request intranet connection of the mobile communication terminal 100 to the service link server 300. Meanwhile, when an Evolved Packet System (EPS) session with the public PGW 610 is formed, the mobile communication terminal 100 may request intranet connection to the service link server 300 through an independent channel (for example, a circuit-switched channel, a Wifi network-based channel) different from that of the EPS session.

When the service link server 300 receives the request for private network connection from the mobile communication terminal 100 or the third server 400, the service link server 300 may perform authentication necessary for the function requested from the mobile communication terminal, and request a procedure necessary for private network connection from the HSS 430. That is, when the service link server 300 receives a request for intranet connection of the mobile communication terminal from the mobile communication terminal 100 or the third server 400, the service link server 300 identifies identification information of the mobile communication terminal and requests Access Point Name-Operator Identifier (APN-OI) change to the HSS 430. In this instance, the identification information of the mobile communication terminal is unique information that identifies the terminal, and may be, for example, identification information of International Mobile Subscriber Identity (IMSI) or Mobile Station International Subscriber Directory Number (MSISDN). Particularly, when the mobile communication terminal 100 runs a private network service related application, or the mobile communication terminal 100 dials a phone number including a private network service related identification code, the service link server 300 may receive a request for intranet connection from the mobile communication terminal 100.

The service link server 300 has no limitation on physical design, and may be configured physically equally to or separately from the third server or the home subscriber server according to the design and embodiment.

The third server 400 is an external link server that may request private network connection of the mobile communication terminal, and the third server may be, for example, an access control system or access management server of business premises such as enterprises. That is, when a user of the mobile communication terminal 100 enters business premises, the third server 400 may request APN-OI change of the mobile communication terminal 100 to the service link server 300. When the mobile communication terminal 100 requests private network connection to the service link server 300, the third server 400 may be omitted, and the third server 400 is not limited to an acesss control system or access management server.

The MME 410 is a control plane entity for the E-UTRAN 210, and provides mobility management and session management function of the mobile communication terminal 100 through non access stratum (NAS) signaling. Furthermore, the MME 410 manages the state of movement of a subscriber, and for example, manages whether the mobile communication terminal 100 is currently connected to a communication network or the mobile communication terminal 100 is in an idle state, or whether or not the mobile communication terminal 100 is connected to any other entity. Particularly, when the mobile communication terminal 100 attempts connection, the MME 410 requests a subscriber profile of the mobile communication terminal 100 from the HSS 430, identifies an Access Point Name (APN) in the subscriber profile received from the HSS 430, and induces the mobile communication terminal 100 to connect to an access point IP (i.e., a public PGW IP or a private PGW IP) corresponding to the APN using the access point IP. The MME 410 inquires of a DNS server (not shown) about the IP corresponding to the APN, and obtains the IP address corresponding to the APN. Meanwhile, when the MME 410 receives a request for session termination of the mobile communication terminal 100 from the HSS 430, the MME 410 terminates the existing EPS session with the mobile communication terminal 100.

The APN is an access point to which the mobile communication terminal 100 is connected, and includes an APN Network Identifier (APN-NI) and an APN Operator Identifier (APN-OI). The APN-NI is network identification information, and generally records a domain of a communication provider. Furthermore, the APN-OI is identification information for network management affixed after the network identifier, and records a domain representing the private PGW 510 or a domain representing the public PGW 610.

The SGW 420 is a device that manages mobility of the mobile communication terminal 100 between eNodeB included in the E-UTRAN 210 and another base station, and between 3GPP network and EUTRAN, and performs a session control function to deal with payload traffic according to the set session. That is, SGW 420 acts as an anchoring point during handover between base stations and handover between 3GPP systems.

The public PGW 610 connects the mobile communication terminal 100 to a public network such as an Internet network 620, provides IP routing and forwarding functions, and provides packet filtering. In addition, the public PGW 610 allocates an IP address of the mobile communication terminal 100, and acts as a mobility anchoring point during handover between the SGWs 420 or handover between an LTE communication system and a non-3GPP network (for example, WiMax, etc.).

The HSS 430 is a server that stores subscriber information, and stores subscriber profiles for each mobile communication terminal 100. The subscriber profile records whether the mobile communication terminal 100 is subscribed to a private network or not, and the APN of the mobile communication terminal 100. Furthermore, the HSS 430 stores an APN table in which identification information of the mobile communication terminal 100 having subscribed to a private network service is mapped to a private APN-OI.

When the HSS 430 receives a request for change of APN-OI of the mobile communication terminal 100 from the service link server 300, the HSS 430 authenticates whether the mobile communication terminal 100 is subscribed to a private network service or not, and selectively changes the APN-OI of the subscriber profile of the mobile communication terminal 100 to a private APN-OI according to the authentication results. That is, when the mobile communication terminal 100 is subscribed to a private network service, the HSS 430 identifies the private APN-OI of the mobile communication terminal 100 stored in the APN table, and changes the public APN-OI recorded in the subscriber profile to the private APN-OI. In contrast, when the mobile communication terminal 100 is not subscribed to a private network service, the HSS 430 transmits an APN-OI change disabled notification message to the service link server 300. Furthermore, when the HSS 430 receives a request for APN-OI return from the private PGW 510, the HSS 430 changes the private APN-OI recorded in the APN of the subscriber profile of the mobile communication terminal 100 back to the public APN-OI. Meanwhile, when the HSS 430 changes the APN-OI of the subscriber profile, the HSS 430 requests EPS session termination of the mobile communication terminal 100 from the MME 410, to terminate the existing EPS session between the mobile communication terminal 100 and the public PGW 610.

The private PGW 510 is a gateway for connecting the mobile communication terminal 100 to an intranet 520, and when the mobile communication terminal 100 attempts to connect using an APN including a private APN-OI, the private PGW 510 forms a session with the mobile communication terminal 100 and permits access to the intranet 520. In this instance, the private PGW 510 obtains location information of the mobile communication terminal 100, determines whether or not the mobile communication terminal 100 is located in a designated private network service area based on the location information, and when the mobile communication terminal 100 is located in the private network service area, the private PGW 510 forms a session with the mobile communication terminal 100. In contrast, when the mobile communication terminal 100 is not located in the private network service area, the private PGW 510 rejects the formation of a session with the mobile communication terminal 100. The private PGW 510 may allocate an IP address commonly used in the private network.

Furthermore, when the private PGW 510 forms a session with the mobile communication terminal 100, the private PGW 510 periodically identifies the location of the mobile communication terminal 100. When the mobile communication terminal 100 is determined to move out of the private network service area, the private PGW 510 releases the session with the mobile communication terminal 100, and requests for APN-OI return of the mobile communication terminal 100 from the HSS 430, to change the private APN-OI of the subscriber profile back to the public APN-OI.

Figure 2:
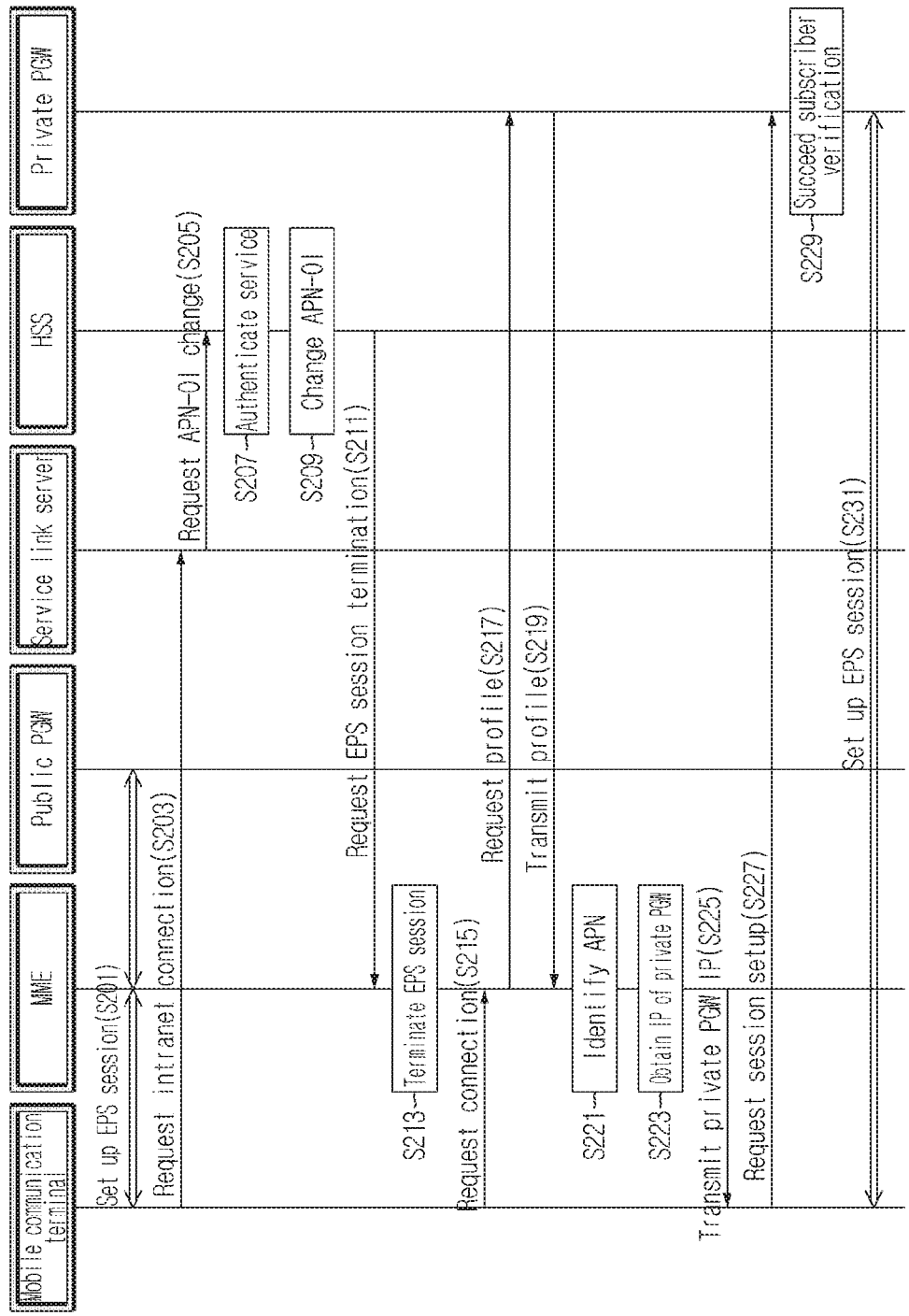
FIG. 2 is a flowchart illustrating a method for connecting, by a private network service system, a mobile communication terminal having subscribed to a private network service to a private PGW according to an embodiment of the present disclosure.

FIG. 2 is a flowchart illustrating a method for connecting, by the private network service system, the mobile communication terminal having subscribed to a private network service to the private PGW according to an embodiment of the present disclosure.

Referring to FIG. 2, when the mobile communication terminal 100 sets up an EPS session with the public PGW 610 and the MME 410, the mobile communication terminal 100 or the third server 400 requests intranet connection to the service link server 300 (S201, S203). In this instance, the mobile communication terminal 100 may request intranet connection to the service link server 300 through an independent channel (for example, 3G-based circuit-switched network, IMS network, WiFi network, Ut interface) different from the EPS session without using the EPS session. The mobile communication terminal 100 may request intranet connection to the service link server 300 through a private network service related application, and may request intranet connection to the service link server 300 by dialing identification code (for example, *770001) representing intranet connection. Furthermore, the third server 400 may request intranet connection of the mobile communication terminal 100 to the service link server 300, and the mobile communication terminal 100 may request intranet connection of the mobile communication terminal 100 through the third server 400, or the third server 400 may request intranet connection of the mobile communication terminal 100 through the mobile communication terminal 100.

Subsequently, as the service link server 300 receives the request for intranet connection of the mobile communication terminal from the mobile communication terminal 100 or the third server 400, the service link server 300 requests APN-OI change from the HSS 430 (S205). In this instance, the service link server 300 identifies identification information (for example, IMSI) of the mobile communication terminal 100, and provides the identification information to the HSS 430.

Subsequently, the HSS 430 identifies the subscriber profile of the mobile communication terminal 100 based on the identification information of the mobile communication terminal 100. Furthermore, the HSS 430 authenticates whether or not the mobile communication terminal 100 is subscribed to a private network service based on the subscriber profile (S207), and when authentication succeeds, the HSS 430 changes the public APN-OI recorded in APN of the subscriber profile to the private APN-OI (S209). In this instance, the HSS 430 identifies the private APN-OI mapped to the identification information of the mobile communication terminal 100 in the APN table, and changes the public APN-OI to the identified private APN-OI. When APN-OI change is completed, the HSS 430 requests EPS session termination from the MME 410 (S211).

Subsequently, the MME 410 determines whether a session with the mobile communication terminal 100 is formed with the public PGW 610 or not, and when a session is formed, the MME 410 terminates the EPS session between the mobile communication terminal 100 and the SGW 420 and the public PGW 610 (S213). The session termination will be described in detail through the description with reference to FIG. 3.

The mobile communication terminal 100 with the terminated EPS session requests connection from the MME 410 (S215). In this instance, the mobile communication terminal 100 may automatically request connection from the MME 410 as soon as the EPS session terminates, and may attempt connection by the user manipulation.

Subsequently, the MME 410 requests the subscriber profile of the mobile communication terminal 100 from the HSS 430 (S217), and receives the subscriber profile of the mobile communication terminal 100 from the HSS 430 (S219). Subsequently, the MME 410 identifies the APN in the subscriber profile of the mobile communication terminal 100 (S221), inquires of the DNS server (not shown) about an IP address corresponding to the APN, and obtains an IP address corresponding to the APN from the DNS server (S223). That is, the MME 410 requests an IP address corresponding to the APN including APN-NI and a private APN-OI from the DNS server, and receives an IP address of the private PGW 510 as the IP address from the DNS server.

Subsequently, the MME 410 uses the IP address of the private PGW 510 obtained from the DNS server (S225). Subsequently, the mobile communication terminal 100 requests session setup from the private PGW 510 having the IP address (S227). The mobile communication terminal 100 transmits current location information to the private PGW 510. The mobile communication terminal 100 may transmit at least one location information of GPS coordinates and a base station cell ID or access point ID detected at the current location to the private PGW 510.

The private PGW 510 performs subscriber verification by analyzing the location information received from the mobile communication terminal 100 (S229). That is, the private PGW 510 performs subscriber verification by identifying whether or not the location information of the mobile communication terminal 100 is included in the preset private network service area. When subscriber verification succeeds, the private PGW 510 forms an EPS session with the mobile communication terminal 100 (S231). The private PGW 510 may form a session with the mobile communication terminal 100 via the SGW 420, the MME 410 and the base station, or may form a session with the mobile communication terminal 100 via the SGW 420 and the base station.

When the EPS session with the private PGW 510 is formed, the mobile communication terminal 100 may access the intranet 520 and obtain or store necessary data.

As described above, the private network service system may allow the mobile communication terminal 100 to access the intranet 520, using the service link server 300, through changing the APN included in the subscriber profile stored on the home subscriber server 430 without changing the terminal standards.

Figure 3:
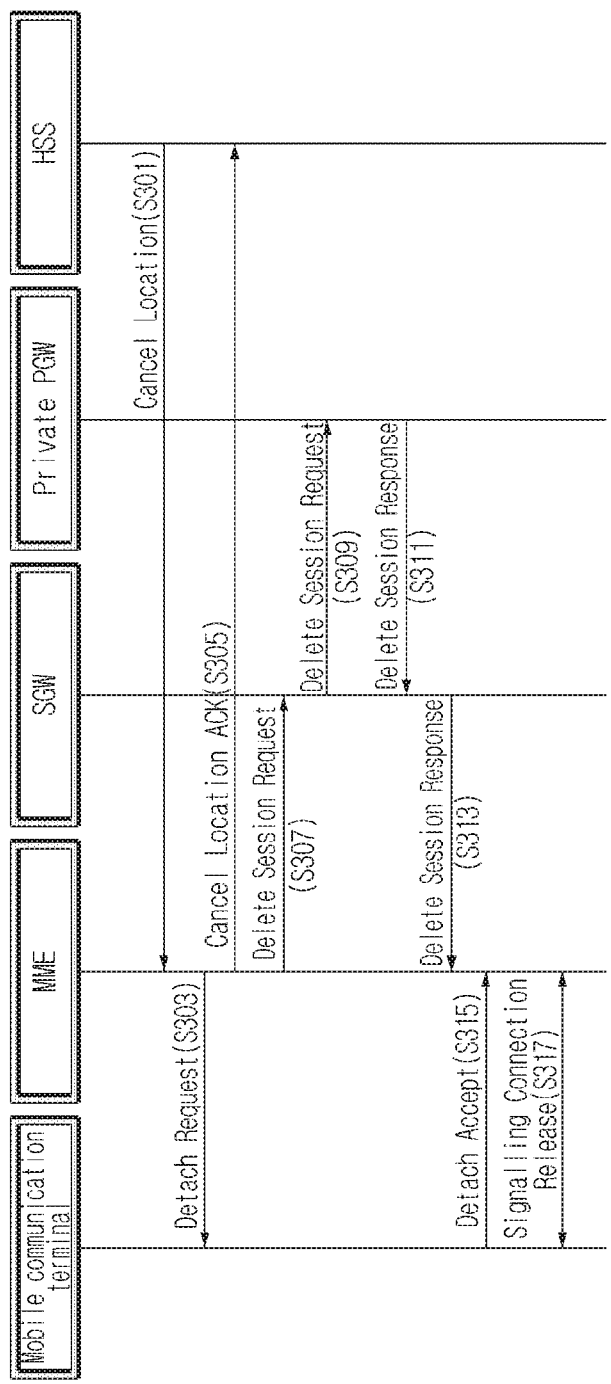
FIG. 3 is a flowchart illustrating a method for releasing, by a private network service system, an EPS session according to an embodiment of the present disclosure.

FIG. 3 is a flowchart illustrating a method for releasing, by the private network service system, an EPS session according to an embodiment of the present disclosure.

Referring to FIG. 3, when APN-OI is changed, the HSS 430 transmits a cancel location message including identification information (for example, IMSI) of the mobile communication terminal 100 to the MME 410, to release the session of the mobile communication terminal 100 (S301).

Subsequently, the MME 410 initiates a procedure for releasing the session of the mobile communication terminal 100 and transmits a detach request message to the mobile communication terminal 100 (S303), and transmits a cancel location ACK message to the HSS 430 (S305).

Subsequently, to release the session with the SGW 420 and the public PGW 610, the MME 410 transmits a delete session request message to the SGW 420 (S307), and the SGW 420 transmits the delete session request message to the public PGW 610 (S309).

Subsequently, the public PGW 610 transmits a delete session response message to the SGW 420 and releases the session with the SGW 420 (S311). Subsequently, the SGW 420 transmits the delete session response message to the MME 410 and releases the session with the MME 410 (S313).

When the MME 410 receives a detach accept message from the mobile communication terminal 100 (S315), the MME 410 releases the connection established with the mobile communication terminal 100 by releasing a signaling connection with the mobile communication terminal 100 (S317).

According to this procedure, the EPS session between the mobile communication terminal 100 and the public PGW 610 is released. That is, when the HSS 430 changes APN-OI, the HSS 430 requests cancel registration from the MME 410, and the MME 410 releases the connection with the mobile communication terminal 100 by requesting connection release with the mobile communication terminal 100, and the MME 410 releases the session between the MME 410, the SGW 420 and the public PGW 610 by requesting session release from the SGW 420.

Figure 4:
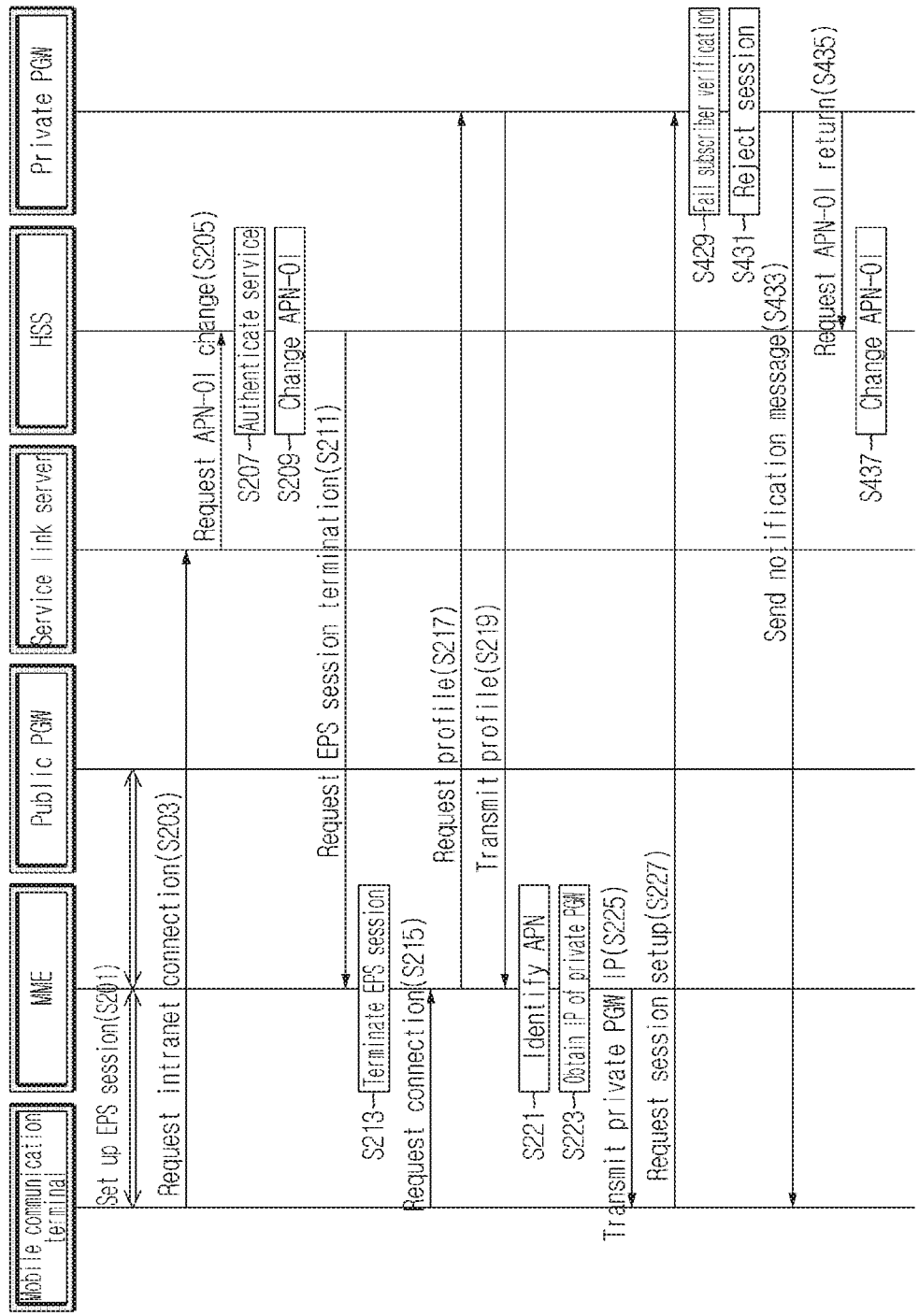
FIG. 4 is a flowchart illustrating a method for cutting off, by a private network service system, private network connection of a mobile communication terminal located in a non-private network service area according to another embodiment of the present disclosure.

FIG. 4 is a flowchart illustrating a method for cutting off, by the private network service system, private network connection of the mobile communication terminal located in a non-private network service area according to another embodiment of the present disclosure.

In the description with reference to FIG. 4, the steps having the same figure symbols as those of FIG. 2 are performed by the same process as FIG. 2, and in the description with reference to FIG. 4, overlapping parts with FIG. 2 are described in brief and description is provided based on difference(s).

Referring to FIG. 4, when the mobile communication terminal 100 sets up an EPS session with the public PGW 610 and the MME 410, the mobile communication terminal 100 or the third server 400 requests intranet connection to the service link server 300 (S201, S203).

Subsequently, as the service link server 300 receives the request for intranet connection of the mobile communication terminal from the mobile communication terminal 100 or the third server 400, the service link server 300 requests APN-OI change from the HSS 430 (S205). Subsequently, the HSS 430 identifies the subscriber profile of the mobile communication terminal 100, and authenticates whether or not the mobile communication terminal 100 is a terminal having subscribed to a private network service based on the subscriber profile (S207). When service authentication of the mobile communication terminal 100 succeeds, the HSS 430 identifies a private APN-OI mapped to the identification information of the mobile communication terminal 100 in the APN table, and changes the public APN-OI recorded in the APN of the subscriber profile to the identified private APN-OI (S209). Furthermore, the HSS 430 requests EPS session termination from the MME 410 (S211).

Subsequently, the MME 410 terminates the EPS session between the mobile communication terminal 100 and the public PGW 610 (S213). After termination, the mobile communication terminal 100 with the terminated EPS session requests connection from the MME 410 (S215).

Subsequently, the MME 410 requests the subscriber profile of the mobile communication terminal 100 from the HSS 430, and receives the subscriber profile of the mobile communication terminal 100 from the HSS 430 (S217, S219). Subsequently, the MME 410 identifies the APN in the subscriber profile of the mobile communication terminal 100, obtains an IP address corresponding to the APN through the DNS server (not shown), and uses the obtained IP address (i.e., the IP address of the private PGW) (S223, S225).

Subsequently, the mobile communication terminal 100 requests session setup from the private PGW 510 having the IP address of the mobile communication terminal 100 (S227). The mobile communication terminal 100 transmits current location information to the private PGW 510. The mobile communication terminal 100 may transmit at least one location information of GPS coordinates of the mobile communication terminal 100 and a base station cell ID or access point ID detected at the current location to the private PGW 510.

The private PGW 510 performs subscriber verification by analyzing the location information received from the mobile communication terminal 100. That is, the private PGW 510 performs subscriber verification by identifying whether or not the location information is included in the preset private network service area.

When subscriber verification fails (S429), the private PGW 510 rejects the session requested from the mobile communication terminal 100 (S431). Furthermore, the private PGW 510 generates a notification message informing that a private network service is impossible at the current location and sends it to the mobile communication terminal 100 (S433). For example, the private PGW 510 may send a notification message such as "You cannot access intranet at your current location. Please attempt connection again in a service area." to the mobile communication terminal 100.

Subsequently, the private PGW 510 requests an APN-OI return of the mobile communication terminal 100 from the HSS 430 or the service link server 300 (S435). Subsequently, the HSS 430 or the service link server 300 returns the private APN-OI changed at S209 to the public APN-OI, to record a default APN in the subscriber profile. That is, when the mobile communication terminal 100 having subscribed to a private network service is not located in a private network service area, the private PGW 510 requests APN-OI return from the HSS 430 or the service link server 300, and to connect the mobile communication terminal 100 to the public PGW 610, the HSS 430 changes the private APN-OI recorded in the APN of the subscriber profile to the public APN-OI.

According to this procedure, when the mobile communication terminal 100 subscribed to a private network service but is not located in a private network service area, the APN-OI in the subscriber profile of the mobile communication terminal 100 returns to the public APN-OI, and the mobile communication terminal 100 cannot access the intranet 520 and can only access a public network, the Internet network 620.

Figure 5:
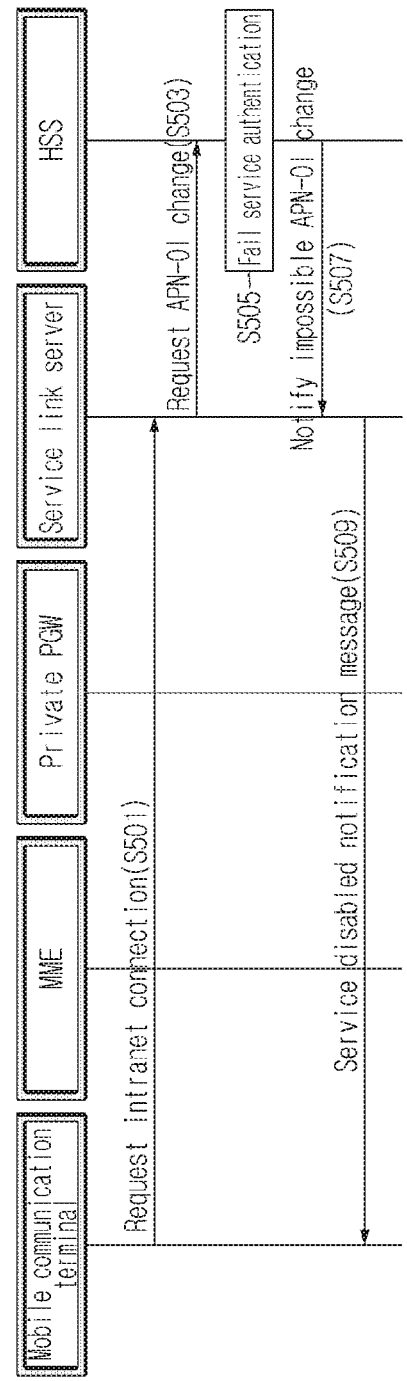
FIG. 5 is a flowchart illustrating a method for cutting off, by a private network service system, private network connection of a mobile communication terminal having not subscribed to a private network service according to still another embodiment of the present disclosure.

FIG. 5 is a flowchart illustrating a method for cutting off, by the private network service system, private network connection of the mobile communication terminal having not subscribed to a private network service according to still another embodiment of the present disclosure.

Referring to FIG. 5, the mobile communication terminal 100 or the third server 400 requests intranet connection of the mobile communication terminal 100 to the service link server 300 (S501). The mobile communication terminal 100 may request intranet connection to the service link server 300 through a private network service related application, and may request intranet connection to the service link server 300 by dialing identification code (for example, *770001) representing intranet connection. Furthermore, the third server 400 may request intranet connection of the mobile communication terminal 100 to the service link server 300.

Subsequently, when the service link server 300 receives the request for intranet connection of the mobile communication terminal from the mobile communication terminal 100 or the third server 400, the service link server 300 requests APN-OI change from the HSS 430 (S503). In this instance, the service link server 300 identifies identification information (for example, IMSI) of the mobile communication terminal 100, and provides the identification information to the HSS 430.

Subsequently, the HSS 430 identifies the subscriber profile of the mobile communication terminal 100 based on the identification information of the mobile communication terminal 100. Furthermore, the HSS 430 authenticates whether or not the mobile communication terminal 100 is a terminal having subscribed to a private network service based on the subscriber profile, and when authentication fails, the HSS 430 transmits a message informing that APN-OI change is impossible to the service link server 300 (S505, S507). That is, when the HSS 430 receives the request for APN-OI change of the mobile communication terminal 100 that is not subscribed to a private network service, the HSS 430 transmits a message informing that APN-OI change is impossible to the service link server 300. Furthermore, when the HSS 430 receives the request for APN-OI change of the mobile communication terminal 100 that is not subscribed to a private network service, the HSS 430 may transmit a service disabled message to the mobile communication terminal 110.

The service link server 300 having received the message informing that APN-OI change is impossible transmits the service disabled notification message informing that a private network service is impossible due to the unsubscribed service to the mobile communication terminal 100 or the third server 400 (S509). For example, the service link server 300 may transmit a notification message such as "You are not subscribed to a private network service. Please use after subscribing to a private network service." to the mobile communication terminal 100.

According to the procedure of FIG. 5, when the mobile communication terminal 100 that is not subscribed to a private network service requests intranet connection, the HSS 430 does not change the public APN-OI recorded in the subscriber profile of the mobile communication terminal 100 to the private APN-OI, and maintains the public APN-OI, irrespective of whether the mobile communication terminal 100 is located in a private network service area. Accordingly, the mobile communication terminal 100 that is not subscribed to a private network service cannot access the intranet 520, and can only access the Internet 620 through the public PGW 610.

Figure 6:
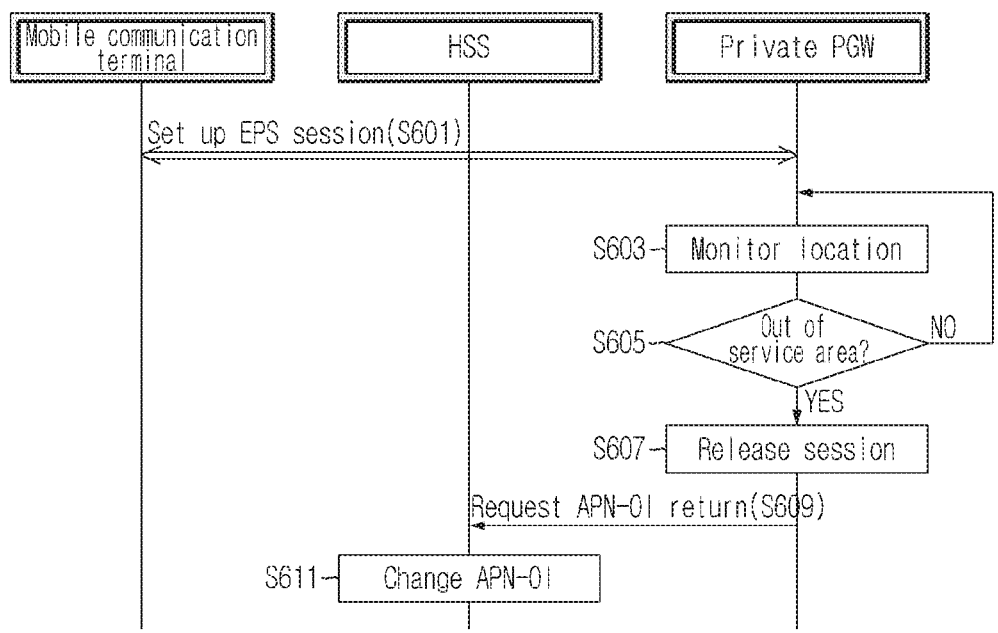
FIG. 6 is a flowchart illustrating a method for returning, by a private network service system, an APN-OI of a subscriber to a public APN-OI according to an embodiment of the present disclosure.

FIG. 6 is a flowchart illustrating a method for returning, by the private network service system, APN-OI of a subscriber to a public APN-OI according to an embodiment of the present disclosure.

The process according to FIG. 6 is performed after the procedure according to FIG. 2.

Referring to FIG. 6, the private PGW 510 sets up an EPS session with the mobile communication terminal 100, and permits intranet connection of the mobile communication terminal 100 (S601).

Furthermore, the private PGW 510 continuously monitors the location of the mobile communication terminal 100, and determines whether or not the mobile communication terminal 100 moves out of a private network service area (S603, S605). That is, the mobile communication terminal 100 continues to transmit its location information (i.e., GPS coordinates, cell ID, etc.) to the private PGW 510, and the private PGW 510 determines whether or not the mobile communication terminal 100 moves out of a private network service area based on the location of the mobile communication terminal 100.

Subsequently, when the mobile communication terminal 100 is determined to be still located in the private network service area, the private PGW 510 performs S603 again.

In contrast, when the mobile communication terminal 100 is determined to have moved out of the private network service area, the private PGW 510 releases the EPS session set up with the mobile communication terminal 100 (S607). Furthermore, the private PGW 510 requests APN-OI return of the mobile communication terminal 100 from the HSS 430 or the third server 400 (S609).

Subsequently, the HSS 430 extracts the subscriber profile of the mobile communication terminal 100, and returns the private APN-OI recorded in the APN of the subscriber profile to the public APN-OI, to record the default APN in the subscriber profile (S611).

Meanwhile, when the mobile communication terminal 100 moves out of the private network service area and the EPS session is released, the private PGW 510 may generate a text message informing that a private network service is impossible at the current location and send it to the mobile communication terminal 100.

Meanwhile, although the foregoing embodiment describes that an EPS session is formed between the mobile communication terminal and the gateway 610 or 510, it should be noted that the private network providing service according to the present disclosure can be applied even when a different session from an EPS session type is formed in the mobile communication terminal 100.

As described above, the private network service system according to the present disclosure connects the mobile communication terminal 100 to a private network without changing the function of the terminal, thereby providing a general purpose private network service irrespective of terminal standards. Furthermore, the private network service system provides a private network service through changing the subscriber profile, thereby minimizing system changes and minimizing costs incurred to maintain and manage a private network service.

While this specification contains many features, the features should not be construed as limiting the scope of the disclosure or the appended claims. Certain features described in the context of separate exemplary embodiments can also be implemented in combination in a single exemplary embodiment. Conversely, various features described in the context of a single exemplary embodiment can also be implemented in multiple exemplary embodiments separately or in any suitable subcombination.

Although the drawings describe the operations in a specific order, one should not interpret that the operations are performed in a specific order as shown in the drawings or successively performed in a continuous order, or all the operations are performed to obtain a desired result. Multi-tasking or parallel processing may be advantageous under a particular environment. Also, it should be understood that all exemplary embodiments do not require the distinction of various system components made in the above mentioned embodiment. The program components and systems may be generally implemented as a single software product or multiple software product packages.

The above mentioned method of the present disclosure may be implemented as program instructions and recorded in non-transitory computer-readable media (such as, for example, a compact disk-read only memory (CD ROM), random access memory (RAM), read-only memory (ROM), floppy disks, hard disks, magneto-optical disks, and the like). This process may be easily performed by person having ordinary skill in the technical field to which the present disclosure belongs, and its detailed description is omitted herein.

It should be noted various substitutions, modifications, and changes may be made to the present disclosure by person having ordinary skill in the technical field to which the present disclosure belongs without departing from the scope of the present disclosure, and the present disclosure is not limited by the above described embodiments and the accompanying drawings.

What is claimed is:

1. A private network service system comprising:
a service link server configured to:
obtain identification information of a mobile communication terminal connected to a public network, and request an Access Point Name-Operator Identifier (APN-OI) change to a home subscriber server, in response to the service link server receiving a request for a private network connection, the request for the private network connection being received from the mobile communication terminal or from a third server;
a home subscriber server, comprising a processor and a memory, configured to:
authenticate whether the mobile communication terminal is subscribed to a private network service in response to the request for the APN-OI change from the service link server, and
in response to the authentication succeeding, identify an Access Point Name (APN) included in a subscriber profile of the mobile communication terminal stored on the home subscriber server and change a public APN-OI recorded in the APN to a private APN-OI; and
a mobility management entity, implemented by a processor and a memory, that:
receives the subscriber profile of the mobile communication terminal from the home subscriber server, and
induces the mobile communication terminal to connect to a public gateway or a private gateway using an IP address of a public gateway or an IP address of a private gateway corresponding to the APN included in the subscriber profile, in response to connection being attempted from the mobile communication terminal.

2. The private network service system according to claim 1,
wherein, in response to the mobile communication terminal requesting a session setup with the private gateway, the private gateway is configured to identify a location of the mobile communication terminal and determine whether the mobile communication terminal is located in a private network service area based on the location, and
wherein, in response to the mobile communication terminal being located in the private network service area, the private gateway is configured to form a session with the mobile communication terminal.

3. The private network service system according to claim 2, wherein in response to the mobile communication terminal not being located in the private network service area, the private gateway is configured to reject the session setup requested by the mobile communication terminal, and
the home subscriber server is configured to identify the APN included in the subscriber profile, and change the private APN-OI recorded in the APN to the public APN-OI.

4. The private network service system according to claim 1,
wherein in response to the authentication failing, the home subscriber server is configured to maintain the APN-OI recorded in the APN as the public APN-OI, and transmit a service disabled message to the mobile communication terminal.

5. The private network service system according to claim 1, wherein in response to a session between the mobile communication terminal and the private gateway being formed and the mobile communication terminal moving out of a private network service area, the private gateway is configured to release the session with the mobile communication terminal, and the home subscriber server is configured to identify the APN included in the subscriber profile, and change the private APN-OI recorded in the APN to the public APN-OI.

6. The private network service system according to claim 1, wherein in response to the public APN-OI being changed to the private APN-OI, the home subscriber server is configured to request a session release of the mobile communication terminal from the mobility management entity, and
the mobility management entity is configured to release a session with the mobile communication terminal.

7. The private network service system according to claim 1, wherein in response to the public APN-OI being changed to the private APN-OI, the home subscriber server is configured to transmit a cancel location message to the mobility management entity, and
the mobility management entity is configured to transmit a connection release request message to the mobile communication terminal, transmit a cancel location ACK message to the home subscriber server in response to the cancel location message, and transmit a cancel session request message to the public gateway.

8. The private network service system according to claim 1, wherein to limit an external connection other than a service subscriber, the home subscriber server is configured to store an APN table including identification information of a plurality of mobile communication terminals subscribed to the private network service and a plurality of corresponding private APN-OI mapped to each other, and identify the APN table storing the plurality of corresponding private APN-OI mapped to the identification information of the plurality of mobile communication terminals and change the public APN-OI to the private APN-OI.

9. The private network service system according to claim 1, wherein the identification information of the mobile communication terminal comprises identification information of International Mobile Subscriber Identity (IMSI) or Mobile Station International Subscriber Directory Number (MSISDN).

10. The private network service system according to claim 1, wherein the request for the private network connection received by the service link server is received in a manner other than through the public network.

11. The private network service system according to claim 1, wherein the service link server is external to the public network and external to a private network associated with the private network service.

12. A method for providing a private network service, in which a private network service system provides a subscriber with the private network service, the method comprising:
receiving a request for a private network connection of a mobile communication terminal connected to a public network;
authenticating whether the mobile communication terminal is subscribed to the private network service;
in response to the authentication succeeding, identifying an Access Point Name (APN) included in a subscriber profile of the mobile communication terminal, and changing a public Access Point Name-Operator Identifier (APN-OI) recorded in the APN to a private APN-OI;
in response to a request for connection being received from the mobile communication terminal, identifying the subscriber profile of the mobile communication terminal, and obtaining an IP address of a public gateway or an IP address of a private gateway corresponding to the APN included in the subscriber profile; and
inducing the mobile communication terminal to connect to the public gateway or the private gateway using the obtained IP address of the public gateway or the obtained IP address of the private gateway.

13. The method for providing a private network service according to claim 12, further comprising:
after inducing connection to the private gateway,
identifying a location of the mobile communication terminal, and determining whether the mobile communication terminal is located in a private network service area based on the location; and
in response to the mobile communication terminal being located in the private network service area, forming a session between the private gateway and the mobile communication terminal.

14. The method for providing a private network service according to claim 13, wherein the determining comprises:
in response to the mobile communication terminal not being located in the private network service area, rejecting a session formation between the mobile communication terminal and the private gateway; and
changing the private APN-OI recorded in the APN of the subscriber profile to the public APN-OI.

15. The method for providing a private network service according to claim 12, wherein the receiving of the request for the private network connection comprises receiving the request for the private network connection of the mobile communication terminal from the mobile communication terminal or through a third server.

16. The method for providing a private network service according to claim 12, wherein in response to the authentication failing, the method comprises maintaining the APN-OI as the public APN-OI, and transmitting a service disabled message to the mobile communication terminal.

17. The method for providing a private network service according to claim 12, wherein the changing to the private APN-OI comprises releasing a session with the mobile communication terminal when the public APN-OI is changed to the private APN-OI.

18. The method for providing a private network service according to claim 12, wherein the method further comprises:
after inducing a connection to the private gateway and in response to a session being formed between the private gateway and the mobile communication terminal, monitoring whether the mobile communication terminal moves out of a private network service area; and
in response to the mobile communication terminal being determined to have moved out of the private network service area as a result of the monitoring, releasing the session with the mobile communication terminal, and changing the private APN-OI recorded in the APN of the subscriber profile to the public APN-OI.

19. The method for providing a private network service according to claim 12, wherein the request for the private network connection is received by a service link server that is external to the public network and external to a private network associated with the private network service.

* * * * *